United States Patent
House et al.

(10) Patent No.: US 12,475,929 B2
(45) Date of Patent: Nov. 18, 2025

(54) PLAY SEQUENCE VISUALIZATION AND ANALYSIS

(71) Applicant: Disney Enterprises, Inc., Burbank, CA (US)

(72) Inventors: Gregory House, Burbank, CA (US); Ilke Levent Akin, Burbank, CA (US)

(73) Assignee: DISNEY ENTERPRISES, INC., Burbank, CA (US)

(*) Notice: Subject to any disclaimer, the term of this patent is extended or adjusted under 35 U.S.C. 154(b) by 0 days.

(21) Appl. No.: 17/303,972

(22) Filed: Jun. 11, 2021

(65) Prior Publication Data
US 2021/0350833 A1 Nov. 11, 2021

Related U.S. Application Data

(63) Continuation of application No. 14/942,579, filed on Nov. 16, 2015, now Pat. No. 11,049,526, which is a
(Continued)

(51) Int. Cl.
*G11B 27/28* (2006.01)
*A63B 24/00* (2006.01)
(Continued)

(52) U.S. Cl.
CPC .......... *G11B 27/28* (2013.01); *A63B 24/0021* (2013.01); *G11B 27/036* (2013.01);
(Continued)

(58) Field of Classification Search
CPC ....... G11B 27/28; G11B 27/036; G11B 27/13; A63B 24/0021; A63B 24/0062;
(Continued)

(56) References Cited

U.S. PATENT DOCUMENTS

2005/0285877 A1* 12/2005 Dengler .................... G06T 7/97
345/632
2008/0015061 A1* 1/2008 Klein ................. G09B 19/0038
473/447
(Continued)

FOREIGN PATENT DOCUMENTS

WO  WO-02071334 A2 *  9/2002  ......... G06K 9/00711

*Primary Examiner* — Loi H Tran
(74) *Attorney, Agent, or Firm* — Fay Kaplun & Marcin, LLP

(57) ABSTRACT

A method for visualizing plays in a sporting event may include receiving a video stream of the sporting event and a measurement stream, asynchronous to the video stream, associated with objects in the sporting event. The method may further include displaying a synchronized presentation of the video stream and the measurement stream. The synchronization may be performed near the time of the displaying. Another method for visualizing plays in a sporting event may include receiving measurement information related to actions from one or more sporting events. The method may also include identifying plays from the actions using the measurement information and displaying a representation of the identified plays. A system for visualizing plays in a sporting event may include an integrated server and a synchronization mechanism. Another method for visualizing plays in a sporting event may include displaying a video of a play selected from a representation.

19 Claims, 9 Drawing Sheets

Visualization and Analysis of Pass Play for American Football

Related U.S. Application Data continuation of application No. 12/834,069, filed on Jul. 12, 2010, now Pat. No. 9,186,548.

(60) Provisional application No. 61/226,933, filed on Jul. 20, 2009.

(51) Int. Cl.

| | |
|---|---|
| *G11B 27/036* | (2006.01) |
| *G11B 27/13* | (2006.01) |
| *H04N 5/262* | (2006.01) |
| *H04N 21/2187* | (2011.01) |
| *H04N 21/234* | (2011.01) |
| *H04N 21/43* | (2011.01) |
| *H04N 21/47* | (2011.01) |
| *H04N 21/81* | (2011.01) |
| *A63B 71/06* | (2006.01) |
| *A63B 102/18* | (2015.01) |
| *A63B 102/22* | (2015.01) |

(52) U.S. Cl.
CPC ........... *G11B 27/13* (2013.01); *H04N 5/2624* (2013.01); *H04N 5/2625* (2013.01); *H04N 21/2187* (2013.01); *H04N 21/23418* (2013.01); *H04N 21/43072* (2020.08); *H04N 21/47* (2013.01); *H04N 21/8133* (2013.01); *H04N 21/8146* (2013.01); *A63B 2024/0028* (2013.01); *A63B 2024/0031* (2013.01); *A63B 2024/0034* (2013.01); *A63B 2024/0056* (2013.01); *A63B 24/0062* (2013.01); *A63B 2024/0065* (2013.01); *A63B 2071/0647* (2013.01); *A63B 2102/18* (2015.10); *A63B 2102/22* (2015.10); *A63B 2220/12* (2013.01); *A63B 2220/13* (2013.01); *A63B 2220/20* (2013.01); *A63B 2220/30* (2013.01); *A63B 2220/806* (2013.01); *A63B 2225/20* (2013.01); *A63B 2225/50* (2013.01); *A63B 2243/0025* (2013.01); *A63B 2243/0037* (2013.01); *A63B 2243/0066* (2013.01)

(58) Field of Classification Search
CPC .... A63B 2024/0028; A63B 2024/0031; A63B 2024/0034; A63B 2024/0056; A63B 2024/0065; A63B 2071/0647; A63B 2102/18; A63B 2102/22; A63B 2220/12; A63B 2220/13; A63B 2220/20; A63B 2220/30; A63B 2220/806; A63B 2225/20; A63B 2225/50; A63B 2243/0025; A63B 2243/0037; A63B 2243/0066; H04N 5/2624; H04N 5/2625; H04N 21/2187; H04N 21/23418; H04N 21/43072; H04N 21/47; H04N 21/8133; H04N 21/8146; H04N 21/4307
USPC ........................................................ 386/201
See application file for complete search history.

(56) References Cited

U.S. PATENT DOCUMENTS

| | | | | |
|---|---|---|---|---|
| 2008/0065684 | A1* | 3/2008 | Zilberman | A63B 24/0021 273/317.1 |
| 2008/0312010 | A1* | 12/2008 | Marty | G06T 7/70 73/865.4 |

\* cited by examiner

Select Player

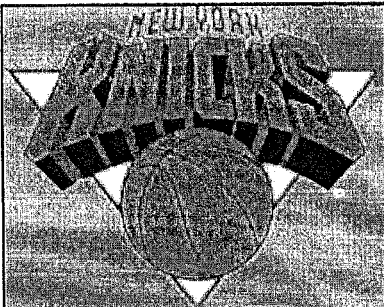

Knicks

- (00) Hughes, Larry
- (01) Duhon, Chris
- (04) Robinson, Nate
- (05) Crawford, Joe
- (07) Harrington, Al
- (08) Gallinari, Danilo
- (09) Wilcox, Chris
- (18) Sene, Mouhamed
- (21) Chander, Wilson
- (23) Richardson, Quentin
- (32) Mobley, Cuttino
- (34) Curry, Eddy
- (42) Lee, David
- (44) Sims, Courtney

Pistons

- (01) Iverson, Allen
- (03) Stuckey, Rodney
- (05) Herrmann, Walter
- (12) Bynum, Will
- (22) Prince, Tayshaun
- (24) McDyess, Antonio
- (25) Johnson, Amir
- (28) Afflalo, Arron
- (30) Wallace, Rasheed
- (32) Hamilton, Richard
- (38) Brown, Kwame
- (42) Sharpe, Walter
- (54) Maxiell, Jason

[All Periods ▽] [Home Shots] [Home and Away Shots] [Away Shots]

FIG. 5

Segmenting the NBA basketball court into zones.

PLAY SEQUENCE VISUALIZATION AND ANALYSIS

CROSS REFERENCE TO RELATED APPLICATIONS

This application claims the benefit of U.S. Provisional Appl. No. 61/226,933, filed Jul. 20, 2009, which is hereby incorporated by reference in its entirety.

FIELD OF INVENTION

Embodiments of this invention relate to video media provided for television, mobile devices and the Internet.

BACKGROUND

Coaching staff, television announcers, analysts and fans have a great interest in understanding the nuances of a sporting event. Statistical records of manually enumerated data have been the longest standing approach for recording "what happened" during a sporting event, and have been the prevalent means for recording the capabilities of athletes. Performance is often measured by enumerated specific actions: baseball batter at bats (hits vs. outs), basketball player shots (made vs. misses), hockey goalie defense (goals vs. saves), and football running back (yards gains vs. carries). These actions may be annotated by observers who detect occurrences of the events and determine the results of the actions. These statistics only give a partial picture of the results of a game.

The use of low cost video solutions has become the standard for coaches and analysts to augment official data. Coaches and broadcast analysts may learn a lot from observing nuances of play surrounding specific actions. For example, these nuances may include a baseball batter swinging, a basketball player planting his or her feet during a shot, a goalie reacting during a shot and a running back identifying holes in the offensive line. Coaches often refer to footage of the games to get answers about what went right or wrong at particular parts of a game. It may be a laborious process to manually edit and analyze hours of footage in preparation for an upcoming game. For instance, assistant coaches of smaller collegiate programs may spend most of their time reviewing game footage of their own and opposing teams.

More recently, systems have become available to record the position, motion and pose of athletes participating in sporting events. The use of such systems has been growing in popularity among coaching staff in select sports. However, other sports have been slow to accept these systems because it may be not clear how the information benefits such organizations. Many coaches have difficulty relating the statistical information received with their analysis gathered from video. What is needed is a more coherent approach to integrate manual statistics, video and automated statistics.

BRIEF DESCRIPTION OF DRAWINGS

Embodiments of the invention are described with reference to the accompanying drawings. In the drawings, like reference numbers may indicate identical or functionally similar elements. The drawing in which an element first appears is generally indicated by the left-most digit in the corresponding reference number.

FIG. 5 illustrates an interface for selecting players for events represented in a summary view, according to an embodiment.

DETAILED DESCRIPTION

The embodiments described herein are illustrative for particular applications. Therefore, it should be understood that the invention is not limited to these embodiments. Those skilled in the art with access to the teachings provided herein will recognize additional modifications, applications, and embodiments within the scope thereof and additional fields in which the invention would be of significant utility.

Figure 1:
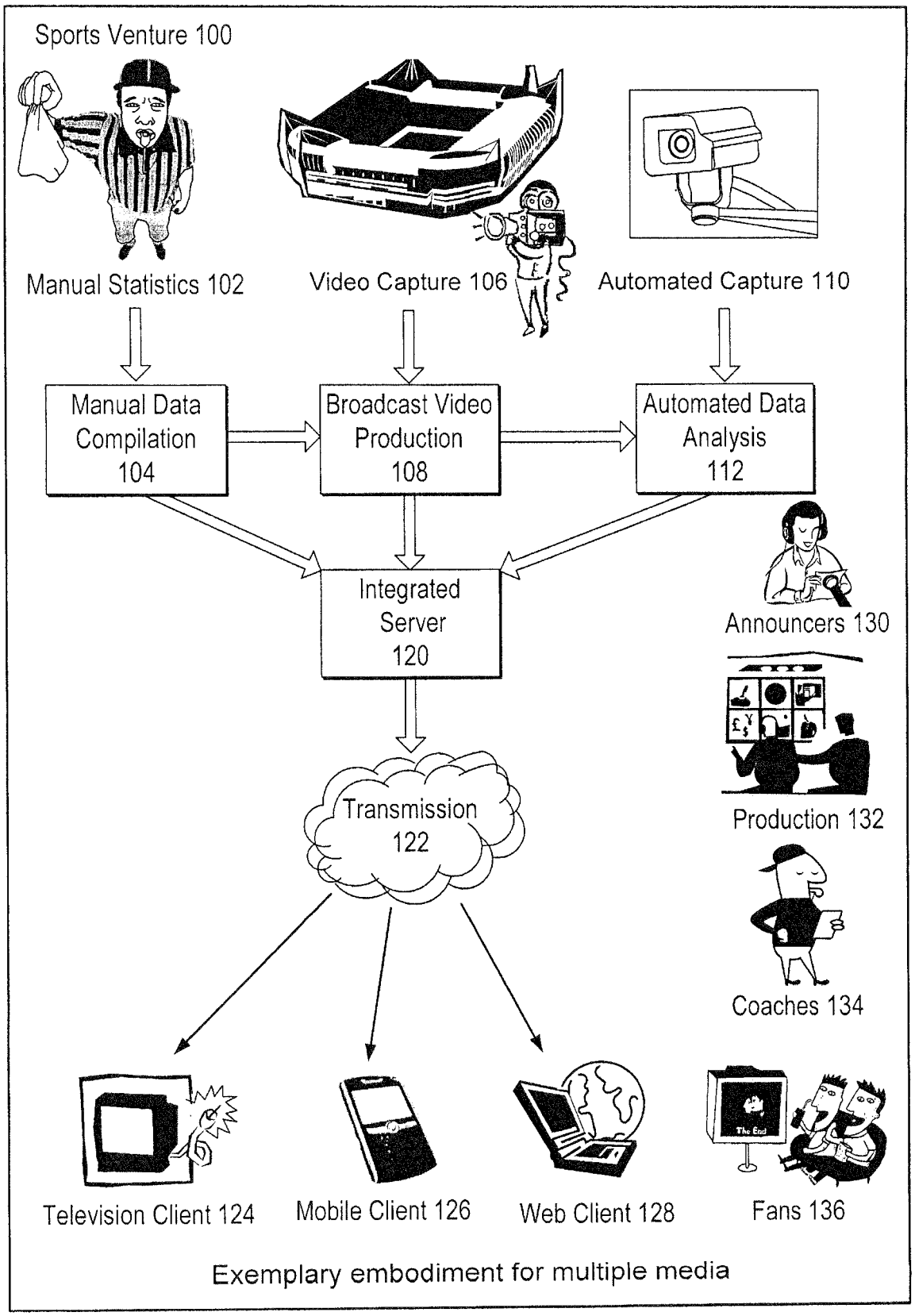
FIG. 1 illustrates an exemplary embodiment for multiple media.

Many coaches and analysts have difficulty relating statistical information with their analysis gathered from video. Video and statistics may be combined in a way to better analyze plays in a sporting event and over many sporting events. Systems and methods for visualizing plays in a sporting event are provided below. FIG. 1 illustrates an exemplary embodiment. Sporting contests are typically held in an arena or sports venue 100. Games of organized sports are supervised by referees who enforce rules governing the play. Official league staff and broadcast support staff manually record events related to play 102: hits/outs for baseball, missed/made shots for basketball, yards gain in American football, etc. Data captured has been expanded to encompass annotating the position of events on the playing surface, such as shots in basketball and hits in baseball. The manual data may be compiled 104 in a portable facility on-site in support of the broadcast production, or possibly at an official centralized location off-site, such a league headquarters. Broadcast cameras provide video coverage 106 of the major sporting events, creating a broadcast feed from multiple camera views: wide game cameras view, narrow isolated camera view, point of view cameras, extra wide beauty shots, etc. Video may be received from multiple sources. In some cases, a video stream may be switching between video sources such as a live video feed and a replay video feed. Television productions may integrate the multiple camera footage into a single feed 108, accompanied by manually extracted data 104.

Object tracking systems record the position and movement of players and ball/puck around the playing surface. Common approaches involve mounting cameras or other sensing devices at various locations in the venue 100, and deriving statistical information using computing elements 112. According to an embodiment, tracking information may be derived directly from broadcast video, which may be combined with an on-site sensor system. In some embodiments, broadcast video analysis may be performed at a location remote from the venue, or additionally, at a time remote from the original event (post-production). A method for realizing object tracking in fixed and moving cameras is detailed in inventions such as U.S. patent application Ser. No. 12/403,857, which is hereby incorporated by reference in its entirety. An object tracking system may also require manual assistance from operators, such as clicking in the video to annotate the location of a specific event such as a hit in hockey.

Embodiments may assist fans, coaches and analysis by integrating disparate technologies of manual statistics, video production coverage and object positional tracking technology in a coherent manner. As seen in FIG. 1, an integrated server 120 may synchronize and combine data and video gathered from official 104, production 108, and tracking 112 sources. Manually recorded statistics for the major organized sports capture a high level overview of a particular the game, by breaking down action into basic scoring attempts such as shots (basketball, hockey, soccer), plays (football, basketball) and at bats (baseball, cricket). The video feed from the broadcast production may be linked with the official statistical source by manually or automatically clipping the video associated with individual scoring attempts, or plays that setup scoring attempts. Alternately, index points corresponding to the start of scoring attempts may be generated for video sequences containing multiple plays. Statistics, data and video from data compiler 104 and video broadcast producer 106 may be received and/or synchronized by automated data analyzer 112.

Embodiments may utilize tracking technology to provide detailed information about play sequences, by breaking down a play into a series of measured athletic actions. Measurements of sporting event actions may be recorded from tracking information and/or video information. Measurements, combined data and/or measurement information based on the measurements and/or a combined data presentation may be transmitted 122 to a remote location using a variety of mediums including internet, telephone, wireless, satellite, etc. Embodiments may support client display devices such as television 124, mobile devices 126 and web platforms 128. Embodiments may have applications for announcers and other sports analysts 130, broadcast television producers 132, coaches and official league staff 134 and both fans and casual spectators 136.

Figure 2:
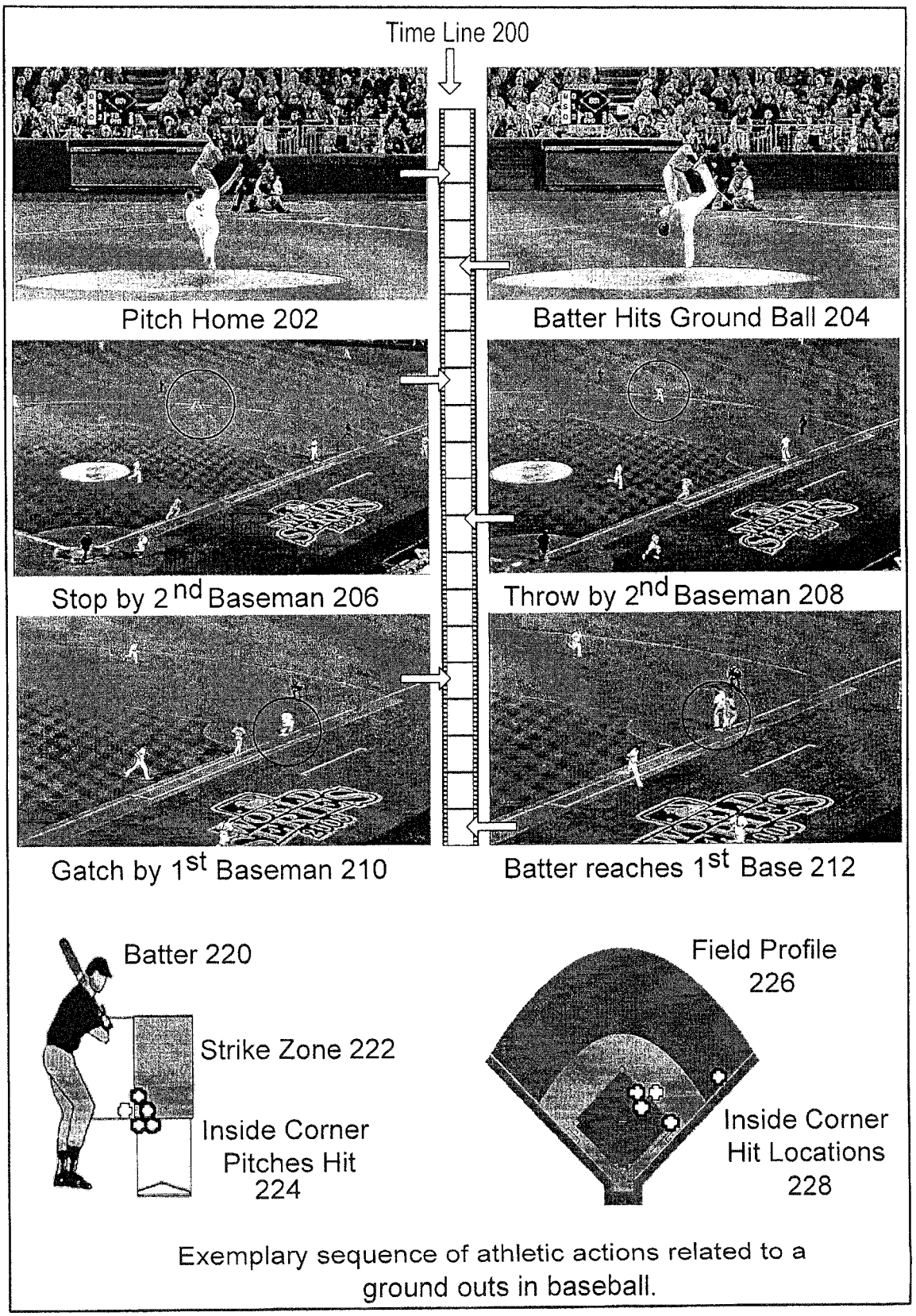
FIG. 2 illustrates a sequence of athletic actions related to a ground out in baseball, according to an embodiment.

FIG. 2 demonstrates play analysis associated with a sequence according to an embodiment. In this example, a sequence related to a fielded ground ball in baseball may be analyzed. Each frame of the diagrams corresponds to a temporal location in time 200 on the film strip. The stages of the play include the pitcher releasing the ball 202, the batter hitting the ball 204, the 2nd baseman fielding the ground ball 206, the 2nd baseman throwing the ball to the 1st baseman 208, the 1st baseman catching the ball 210, and the batter touching the 1st base bag. Such plays or actions of a play may be determined from measurements obtained from observing actions in the sporting event.

According to a further embodiment, video tracking techniques may be applied to broadcast video for detecting various stages of the sequence, including rapid arm motion of pitcher from center field camera and ball motion detect pitch 202, detection of bat swing and ball position relative to plate to find ball crossing relative to strike zone 204, detection of fielder motion relative to bag to determine hit location 206, ball detection of throw 208, last location of ball to detect catch 210; and 1st base bag detection to determine when batter reached first. Alternately, object tracking technology utilizing fixed cameras or sensors on-site may be applied to derive spatial trajectory of pitches 202, spatial position crossing the plate 204, and may be extended to the 3D hit direction and fielding position on the field 206. In one embodiment, a play sequence may contain a single athletic action, such as a baseball pitch or basketball shot. In another embodiment, a play sequence may contain multiple groups of athletic actions, such as multiple shots during a period of continuous play in hockey. Play sequences may also include a window of time surrounding one or more events or plays.

According to embodiments, a relationship between different play sequences may be established through the similarity of measures at a particular stage of the sequence. For example, an approximate two-dimensional (2D) position of baseball pitches relative to the strike zone 222 may be used to relate plays when the batter 220 makes ball contact. For example, pitches in the lower inside corner 224 of the strike zone may be grouped together, and a graphic of the field 226 may be used to show resulting locations 228 of hit balls. Icons of individual plays may be coded by type and speed of a hit ball (possibly using normal notations such as ground outs, fly outs or base hits) and may be further conditioned by type and pitch speed. This graphic may allow coaches to illustrate to pitchers the potential liability of pitching a batter in a particular location, and to instruct fielders on the fine points of positioning in the field when it may be necessary to compensate. In another embodiment, one or more video clips corresponding to batted pitches in a particular region crossing the plate may be displayed sequentially, such as in a high-light reel. This may be used by broadcast analysts, who want to illustrate to viewers at home the difficulties with particular pitch locations for batters.

In another embodiment, measurements derived from a sequence may be used to relate play sequences may be temporal in nature, such as the time for the hit ball to go from home to the infielder. In yet another embodiment, a planar representation may be displayed illustrating the position of baseball throws received from infielders by the 1st baseman. In further embodiments, play sequences directly related to scoring opportunities may be shown. Specific measures and indices that may be used for various sports are detailed in U.S. patent application Ser. No. 12/490,026, which is incorporated by reference in its entirety.

Linking plays through data analysis benefits scenarios requiring fast video retrieval. Applications benefit: a broadcast analyst who needs a fast means to retrieve related video clips during live events; coaching staff performing a post-game review and preparing for the next contest, fans and sports enthusiast who are interested in understanding their teams on a deeper level. Embodiments may be implemented on television platforms, mobile devices, web applications and software packages involved in video editing and video tagging.

The sequence of athletic actions surrounding a basketball scoring attempt (shot) may be analyzed similar to the example for baseball in FIG. 2, according to an embodiment. A basic outline of events may be extracted from the broadcast video, for example: 1) start of a possession with a rebound, turnover, in bound pass or jump ball; 2) detection of the transition from full court to half court play (when the ball crosses half court line); 3) pause in offense movement signally the start of a play set; 4) detection of player activity related positioning of a play maneuver such as a pick to create space for a player; 5) a pass or dribble to get the ball in position for a shot; 6) the vertical jumping motion of a shooter taking a shot; 7) flight of the ball reaching the vicinity of the hoop and backboard; 8) subsequent player motion in the key region may indicate the ball may be rebounded or inbounded to start the next play. Broadcast footage may be analyzed by a video tracking system to extract the basic play sequences of the game. The video source may be recorded with time codes or time stamps referencing to a global/wall clock which may later be used for the game analysis to align sampled data with referenced video frame. Character recognition of broadcast score graphics may be used to derive information about the time (count down clock, quarter), score and personnel on the court. This may be used to synchronize the portions of the footage with the official games statistics. Character recognition of broadcast graphics in broadcast video may be part of automatically analyzing the broadcast video. The change of possession of the basketball may be determined from broadcast video by a change in the camera pan (left to right or from right to left). Wide zoom may be an indicator of general play; where as narrow zoom tends to be used during shots and subsequent rebounds. Backboard detection and ball tracking may be used to derive the location of shots, and information about the trajectory of shots and rate the inaccuracy of missed shots. Additional data may be derived automatically for sequences that a search algorithm may be able to determine the position of the basketball court in the video frame.

Figure 3:
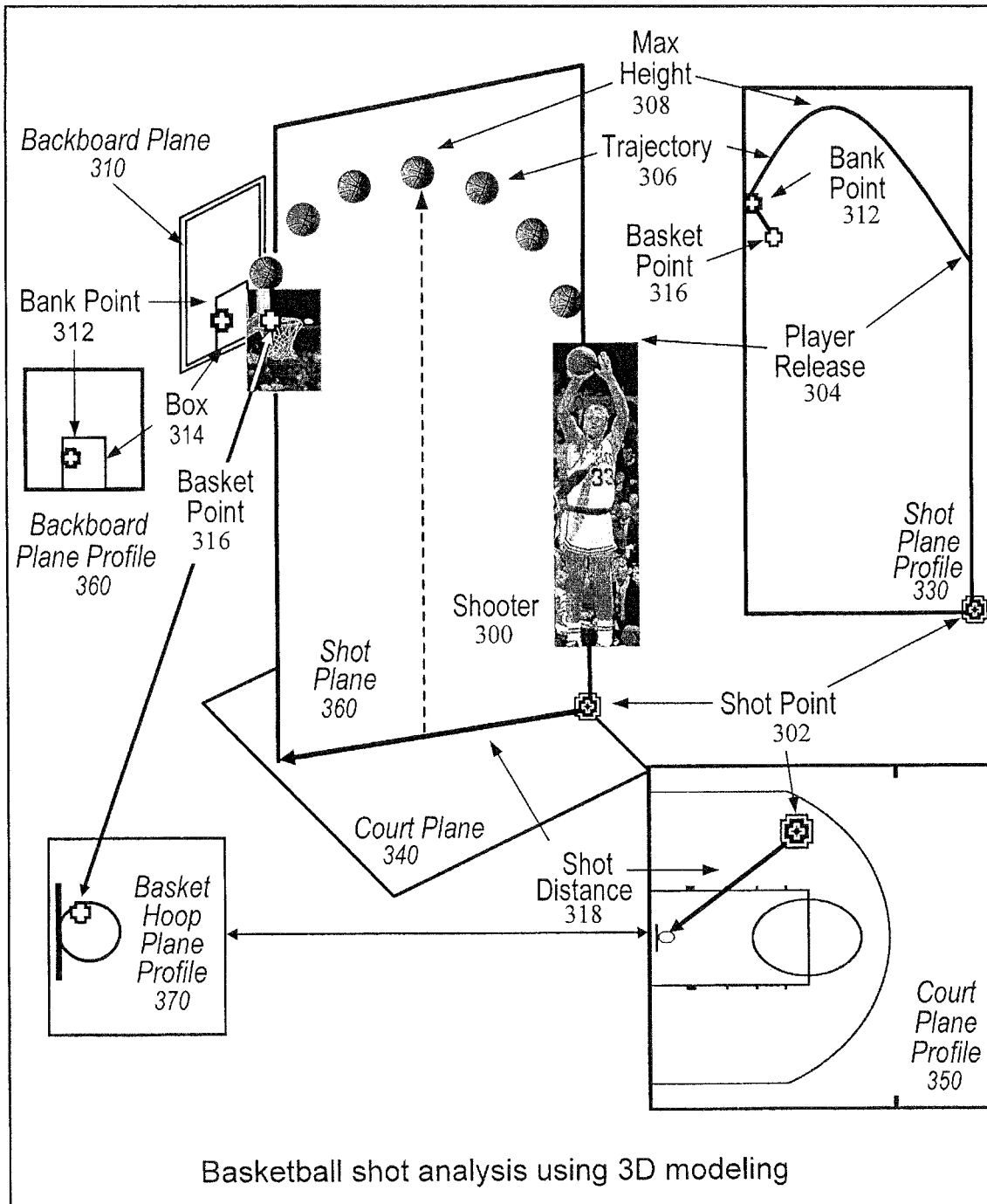
FIG. 3 illustrates a 3D analysis of a backboard shot by a basketball player, according to an embodiment.

FIG. 3 illustrates the 3D analysis of a backboard shot by a basketball player, broken down by the play sequence relating to the shot, according to an embodiment. The basketball shooter 300 takes a jump shot, leaving the basketball court at the shot point 302. The ball releases from the shooter's hand above the floor at the release point 304, follows a trajectory 306 through the air reaching a maximum peak 308, and makes contact with the backboard plane 310 at the bank point 312 near the edge of the shooting box 314, and banks through the basketball hoop at the basket point 316. The ball largely traces a trajectory in a shot plane 320 perpendicular to the court 340, and encompasses the release point 304 and the bank point 312, and may contain the shot point 302 and basket point 316. The shot plane profile 330 illustrates the ball trajectory 306, from the release point 304, though the maximum peak 308, off bank point 312, and into the basket 316. The location of the bank point 312 may be displayed on the profile of backboard plane 360 relative to the shooting box 314, and basket point 316 may be displayed on the profile of the basketball hoop plane 370. The shot distance 318 may be the distance from the shot point 302 to the point below the middle of the basket in the court plane 340, and may be displayed on a profile of the court plane 350 along with the shot point 302.

The profiles of the court plane 350, the backboard plane 360 and the basket hoop plane 370 may provide a mechanism displaying shooting performance across multiple shots, according to a further embodiment. For example, the resulting basket point 316 may be displayed on the basket hoop plane profile 370 for shots from a particular region or of the court plane 340, or for shots with a range of shots distances 318. Similarly, the bank point 318 may be displayed on a backboard plane profile 360, with a target point or region, for shots coming from a particular direction on the playing surface 340. The court plane profile 350 may also be used show the position that rebounds from missed shots that are recovered, according to another embodiment. In a similar manner to above, groups of rebounds may be displayed depending of the area of the initial shot location 302, area of actual bank point 312 or the basket points 316. For example, rebounds corresponding to basketball hitting the rim of the hoop 316 may be displayed in a single court profile graphic. In a given embodiment, the grouping of shots may be used to compose a high-light reel for broadcaster, coaching or fan review.

As illustrated in the example embodiment of FIG. 3, the trajectory of the basketball follows a parabola based on the initial direction, speed and position of the ball at the release position 304, and may be derived from position of the release and max height 308 and time of flight in between or though the analysis of sample points and the known constant of gravity. The angle of the basketball striking the backboard may be derived from analysis of the trajectory 306, and may be used to estimate the angle of the ball rebounding off backboard and crossing the basket hoop plane. The effect of ball spin may be ascertained by comparing this estimated rebound angle from the actual rebound angle, found from the bank point 312 and the basket point 316, and correcting for the effects of elasticity of the ball and the backboard. Shots with steeper angles (rebound or otherwise) when crossing the hoop plane are more likely to be made than ones with shallow angles.

Measurements or positions of actions in plays may be shown in two-dimensional representations, according to an embodiment. For example, through analysis of possible shot scenarios from a given shot point, a target region for the bank point may be displayed in a graphic of the backboard plane profile, according to an embodiment. The size and shape of this region may be shown to vary with the height, speed, direction and spin of the ball at the release point 304, and may be related to the maximum height and arc or the basketball trajectory. A similar analysis may be presented using the basket hoop plane profile 370 for shots not intended to hit the backboard. Alternately, the resulting basketball points 316 may be displayed on the basket hoop plane profile 370 in relationship to measures affecting trajectory (release height, release speed, release direction, max height, ground speed, ball spin speed, ball spin direction, etc.). For example, a graphic displaying the series of shots with low max height may be compared to a graphic corresponding to shots with high max height. A similar graphical comparison for the location of rebound recoveries on the basketball court 316, as a function of max ball height, spin, ball velocity, etc. In a given embodiment, the grouping of shots may be used to compose a high-light reel for broadcaster, coaching or fan review.

Trajectory analysis may be extended to other sports, such as baseball, American football and soccer. For instance, in baseball, the expected path of a hit baseball may be computed from initial trajectory and spin measurements, and the effects of wind may be estimated based on deviations from an expected trajectory. For American football and soccer, the ball moves has a much lighter density and moves at a slower velocity, so that the path tends to deviate more as a function of spin and should be taken into account during the analysis.

Two and three dimensional measurements may be obtained from analysis of sporting event objects. For example, a basketball trajectory may be analyzed in conjunction with information derived regarding the shooter and the defender covering the shooter. Object tracking systems may provide the position and velocity of players and the data may be analyzed over the time window prior to the shot. The distance between players prior to the shot and the motions of the players may provide a measure for how much time the shooter has to set up the shot. This may be augmented by measures of player pose, such as changes in player orientation, the extension of the arms, feet leaving the ground.

More extensive approaches involving the modeling of the position of head, torso and limbs may also be possible. For example, a basketball trajectory may be analyzed in relation to a combination of player position, motion and pose measures. In one embodiment, player position and pose measures will be used to relate shots hurried or with poor form, and the resulting trajectories and/or video footage may be displayed to the output. Alternately, shots with less than ideal trajectories or spin may be used to show a collection of video of the player taking the shot, and related position and pose analysis. Measurements of players may also be obtained from formations of one or more players.

Figure 4:
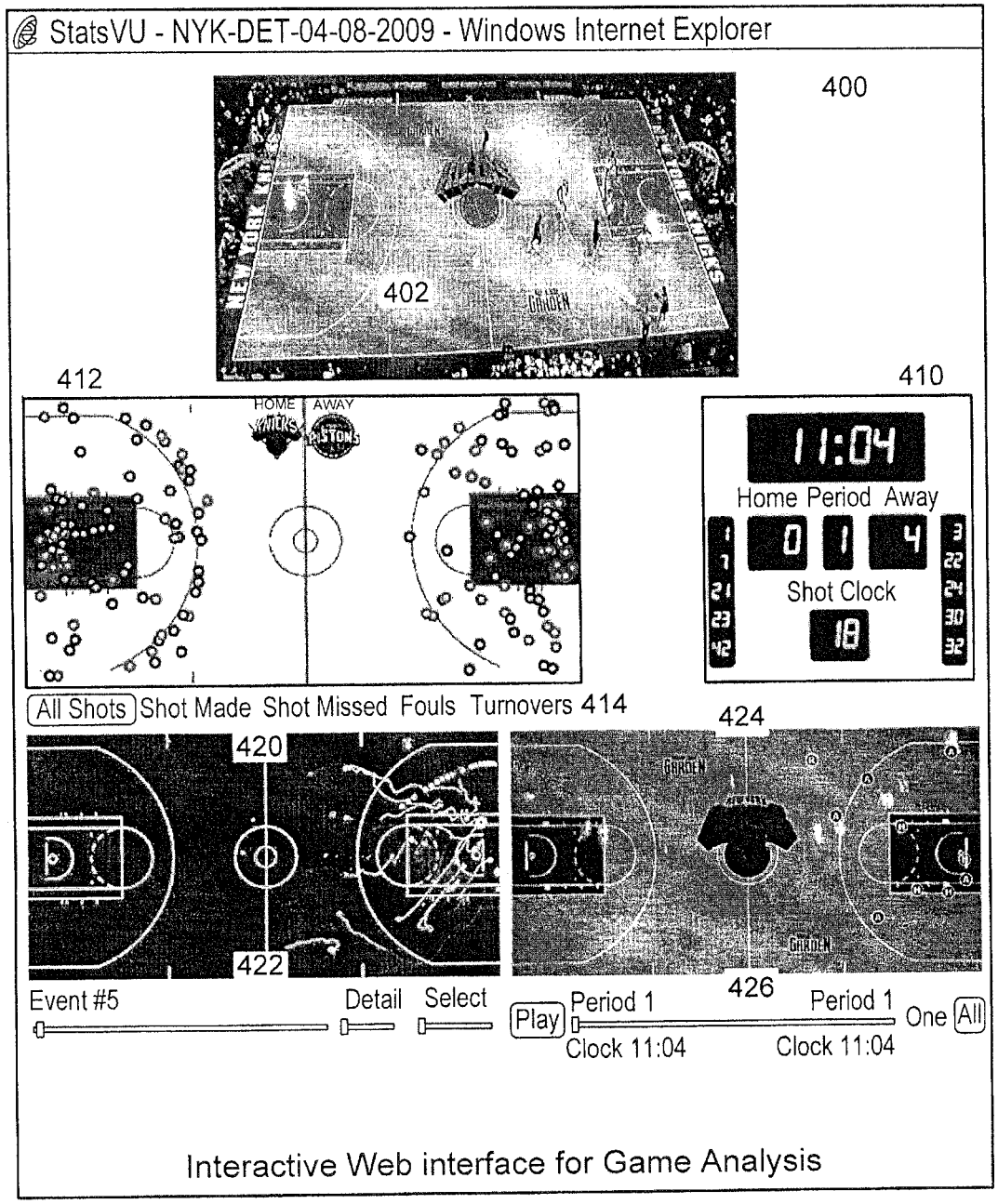
FIG. 4 illustrates an interactive web interface for game analysis, according to an embodiment.

Measurements, actions and objects of a sporting event may be combined into a coherent display. As an example, FIG. 4 illustrates an embodiment that provides interactive game analysis of a basketball through a web interface. The interface window may be represented in a frame with a fixed background color 400. A video window providing a fixed surveillance shot of the entire court may be shown 402. This window may switch with alternate feeds such as a standard broadcast program feed, a dedicated camera feed from a production (high home), a fixed surveillance shot (basketball player tracking), a point of view camera (goal camera), a coaches camera overview, a zoomed shot of a particular player, robotic PTZ cameras, a picture-in-picture, etc.

According to an embodiment, a window corresponding to a game time or an official scoreboard may be shown 410, providing, for example, quarter of play, time remaining in the quarter, time remaining in shot clock, score and numbers of personnel on the court. The game time or official scoreboard display may be part of a time-line representation of a game or a portion of a game. A summary view of key events (such as shots) during ball possessions may be shown overlaying an image of the court 412. In this example view, the left side shows home team shots and the right side shows away team shots. Missed shots are indicated with red and made shots are indicated in green. A menu display 414 allows the selection of displayed events such as made shots, missed shots, fouls, steals; but may be extended to other events as well (rebounds, inbounds, passes, dribbles, etc. Events may be filtered based on the team and player executing the event, or whether a player or group of players was on the court during the event.

FIG. 4 also contains displays related to the object tracking data. For example, the static diagram view 420 may correspond to players' positions over the last six seconds prior to a shot. Different colors of trails may be used for home, away and referee categories; and high-lighted players may be selectable. Ball location trail and position of the key event of play (shot, foul, turnover) may be provided in a diagram view. The interface 422 allows stepping or seeking events in the summary view 404, updating the diagram view representation accordingly. Selecting a specific event in the summary view 404 will result in the controls 422 seeking to the appropriate event.

An animated view that corresponds to the changing player positions over time may be shown in view 424, according to an embodiment. The colors of icons overlaying the basketball court differ for the home, away and referee categories, and character designation may follow category name or follow player uniform number. Animations may be shown in two or three dimensions. The time-line view interface 426 may provide basic video controls such as play, pause, stop, stop action, fast forward, rewind, slow motion, variable speed controls, looping of last play, time scrolling, and seek. This may vary the playback in both the animation window 424 within an event window designated by the event controls 422. The video window 402 may be likewise subject to the animation controls 426. In continuous play mode, the interface will display each clip associated with the events tagged in the summary view from start to finish.

A common means for displaying shooting performance of basketball players may be to annotate the location of shots on a view of the basketball court. For example, summary view 412 comprises a graphical spatial representation of the location of specific events of interest (shots, passes, steals, blocks, rebounds, picks, isolation moves, etc). The location may be a measurement. Measurement information may include or be based on the measurement. The selection of a particular icon on the summary view may enable the display of video, diagram and animation views corresponding to the selected play. A play selection may include one or more selected plays. The video and animation view sequence displayed may be the entire video clip from start of possession (rebound) until a shot is taken. In alternate embodiments, smaller temporal windows of video/animation may be provided corresponding to a play or subset of plays prior to the shot, set prior to the shot and the shot, set prior to the shot, shot itself and the rebound, etc. In some cases, a timestamp of the official recording of the event may be refined and corrected automatically using video processing. For example, shots detected with an accurately time-stamped with video ball tracking may be reconciled with manually recorded shots recorded near the time of the shot, which may be subject to human delay in player identification.

FIG. 5 illustrates a view for selecting players for game analysis, according to an embodiment. Events shown in the summary view 410 may correspond to a combination of players taking a shot or causing a foul/turnover, or a combination of players on the court when the events occurred. A first example scheme allows the direct evaluation of contributions on offense (set pick, take shot, etc). A second example scheme illustrates the ability for a player to make a positive contribution by being on the court, even though other players may not be directly responsible for the measured events. Player groupings may be across different teams, which may reveal the effectiveness of a particular defender on one team covering a star offensive player on the opposing team. An image and basic statistics about a player may be provided with the player selection. In another example, distinction may be made as well between the starters and bench players. Alternate criteria may be applied to limiting the events displayed in the summary view including time period of the game, type of play executed by the offense, pace of play, last two minutes in the period, etc.

Figure 6:
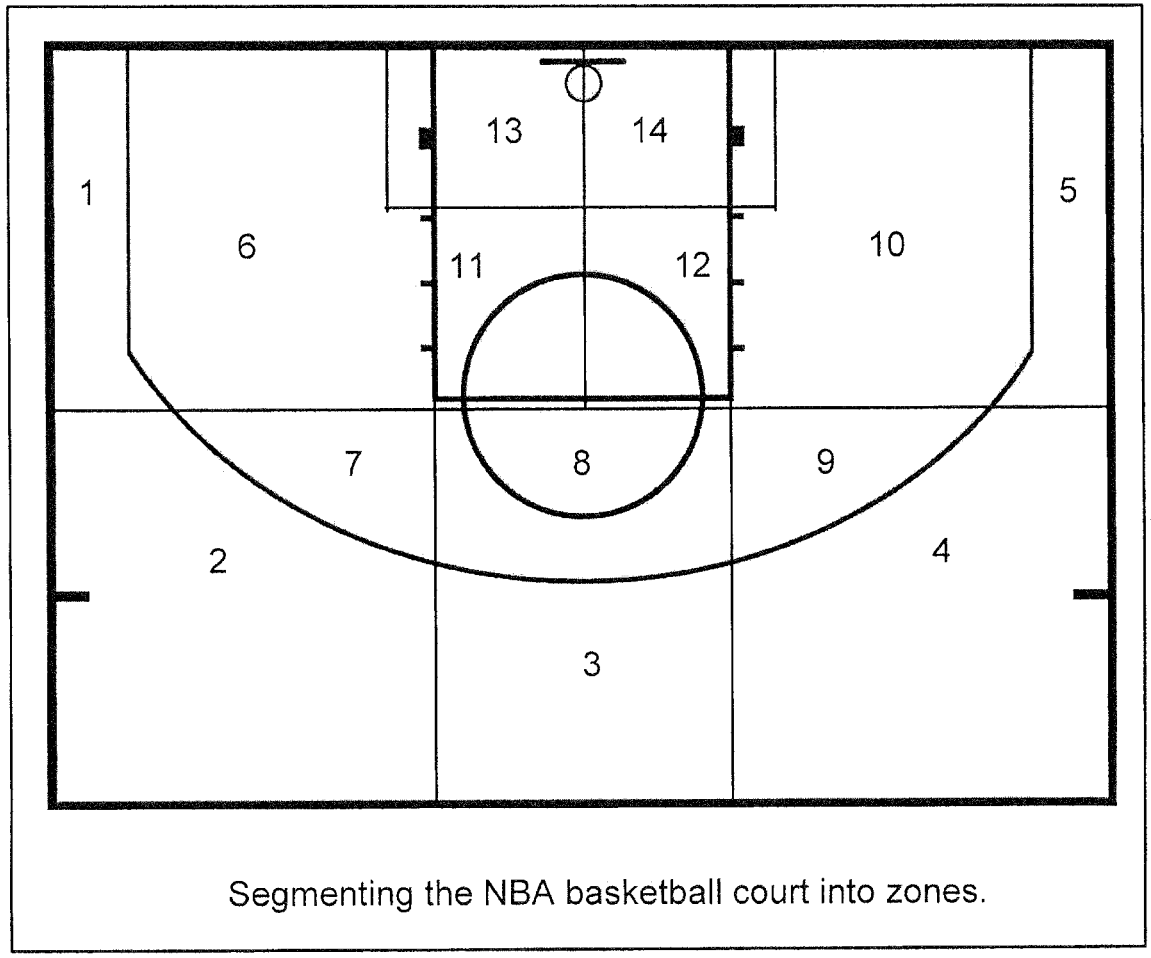
FIG. 6 shows a diagram segmenting a basketball court into zones, according to an embodiment.

A sporting event field of play may be divided into regions for purposes of analysis. For example, it may be advantageous when grouping plays to segment each half court in basketball into set regions. One possible scheme that divides the basketball half court into zones is presented in FIG. 6. In one embodiment, the user may be able to select all the events (such as shots) in a particular zone in the summary review, and view all the video clips of the shots from the zone. In another case, rebound locations corresponding to shots taken from a particular zone may be displayed in a summary graphic. A heat map may correspond to positions of offense/defense players for plays corresponding to shots taken from a particular zone. An overview temperature map based on criteria such as occupancy may be used for showing how well teams penetrated into various zones. A summary view such as a heat map may be considered a diagram view. A zone location corresponding to players prior to taking a shot from a particular zone may be displayed in a summary graphic. This may be a quick indication of how players set up shots in a particular area of the court. Multiple events may be selected using a rubber band box or a combination of shift/controls keys with mouse clicks. The performance of players may be rated for various zones using directed indices, and poor performance based on this spatial analysis may be flagged for further review. Shading of court zones may be realized according to user directed criteria, giving instant feedback about areas of concern to the viewer.

The multiple feeds available in the video window 402 may be selectable by the user, according to an embodiment. For example, an overhead surveillance view may be selected when viewing a game for over all team performance, and isolated side zoomed view when interested in specific player shooting mechanics. In one embodiment, a view provided may be automatically selected based on pre-defined criteria. In another example, a surveillance view may be provided when evaluating one team's defense, but may switch to an isolated view of the player with the ball when the team is on offense. Criteria may include other factors as well such as the pace of the play, personnel on the court, score of the game, etc. In another embodiment, a video window may be comprised of multiple frames of video. For example, a surveillance view may be accompanied by a zoomed-in isolated view largely encompassing a particular player of a player in a group of players. More than one clip or partial clips may be available for a given play (narrow shot, wide shot). Extracted measurements and measurement information may be used to select which portions of a video sequence for an associated play are displayed.

A zoomed-in view representation of a video window may be derived by segmenting a portion of the received video feeds, according to an embodiment. Naturally, the best image may be acquired from the video feed with the highest resolution and clearest line of sight. The Zoom Video View should have proper framing by centering the player of interest in the view. This will allow for each comparison of the mechanics of a shooter, if the shots are framed the same in each case. These views may be likewise normalized (flipped) to take into account shots from left versus right side, so all shots would appear to be similar in orientation. The mechanics of a player's motion may be evaluated by evaluating a pose in zoomed shots using a series of measures such as flow, stance, speed, orientation, etc. In one embodiment, the rating of performance in the zoomed image may be evaluated with user directed indices. It may be possible to show side by side comparisons of multiple players. The flight of a ball and a position of defending players may be determined with an indicator used to evaluate the player mechanics.

Video displays may be synchronized with graphical representations of measurements, statistics or other data, according to embodiments. A broadcast video stream from sporting event may be synchronized with an asynchronous stream of measurement data gathered about the players, the scoring object or actions in the sporting event. The measurement stream may include a sequence of 2D or 3D measurements of objects in the sporting event, may include measurements of one or more actions in the sporting event, or may include measurement information or statistics derived from object measurements or action measurements. The video and measurement streams may be related to the same time mechanism: time code, universal time mechanism, wall clock, game time, game time increment (inning, quarter, and period), play counter, or some other means to measure time.

A synchronization mechanism may relate sampled object data points over time with a frame sampled video in a continuous handshaking scheme. This handshaking technique may cause these two sources to be synchronized with a switching master/slave configuration. The sampled object data points and the video frames may have initial alignment references where pre-adjustments to synchronization mechanism may be possible. The video window 402 and as well the animated view 424 may act like master and/or slave, synchronizing components to one another depending on the value of the content to be presented within these views. In a particular scenario, since the tracked object data points during the game stoppage may not constitute any significance to analysis, the content within animated view 424 may not cover these time episodes, causing video window 402 to act as the master synchronizing element or synchronizing steam to derive the system in general over that period of time.

Other synchronization schemes may be used as well. In an embodiment, the synchronization is performed near the time of display of the video and measurement streams. In another embodiment, the synchronization between the video and measurement streams is performed at a location remote from the venue where the streams originate. This may include a centralized location such as a broadcast studio, or may be a decentralized location such as a end-user laptop displaying a web application. The synchronization and display may occur during the sporting event in the form of a fan application, or may happen after the sporting event in the form of a coaching tool or fan application.

Video window 402 may contain embedded annotations, or may have overlaid graphics that are synchronized with the video feed, according to a further embodiment. Ideally, this should be done with occlusion or semi-transparency so as not to block the objects in the foreground. The graphics employed may be trail location similar to the diagram view 420 or player location annotations similar to the animation view 424. Alternately, it may be hand-written notations of a coach or sports enthusiasts reviewing a game. One embodiment may provide for the notations to be shared with others in the peer group, positioned in time and space according to the generalized synchronization scheme. In a particular embodiment, dragging an overlaid player icon along the diagram view path, controls which instant of the player position is displayed, and hence controls the image displayed in the video and the representation shown in the animated view.

The animated view 424 may comprise a representation that demonstrates the dynamic positions of players on the playing surface over time, according to another embodiment. This may be shown as a top down (top view) perspective. The position of all the players and referees on the court, or the icons for a given teams or selected players of either may be shown. In one embodiment, icons are colored according to team color, accompanied by player uniform number. Icons for select players may also be highlighted differently, such as the group of players contributing to summary view events selection in FIG. 5. The designation of players (color, shape, numerical designation) may depend on an index such as a threat criterion. Selecting the object in the animated view may trigger action in all the other displays. For example, the player may be highlighted in the video, shots that the player has taken may be displayed in the summary view, the trail associated with the player may be shown in the diagram view, the time-line view may indicate time player on the court, and statistics related to the player may be high-lighted. In one embodiment, the sequence of motion forward and backward may be controlled by dragging the player icon in the animated video window appropriately up and back the time-line. In this manner, the player icons may be time-line controls that regulate the update of video in the video window. An animated view display may be halted and various options of the ball handler may be shown (pass, shot, dribble, drop back, dump outside, etc.) An animated view may be an animated display.

The animated view 424 may be displayed with a three-dimensional (3D) viewing angle, such as controlling the view port of the animation window to match the 3D perspective of an observer actively viewing the game in person. In one embodiment, the viewer (coach) may change the viewing position to better identify the deficiency of a players performance during a specific play set. In another embodiment, the height of a player is indicated in the icon so that the observer may judge the difficulty of a particular shot. In another embodiment, rendering of gaming technology may enable the use of realistic player figures. The height of the ball may be rendered in a 3D view, with a pass shown as dashed lines and shots having realistic arcs going to the hoop.

Formation or play analysis may be used to navigate to similar situations in previous parts of the game, or previous games. This may be keyed by particular player match-ups (offense versus defense), a particular individual in a set position of a given player, a specific defense formation type, etc. Spatial position of players in a play set may be used to match like plays elsewhere in the data base, and made available for sequential viewing in the video and animated displays, with supporting representation in the diagram view. This would allow a coach to compare the current scenario against previous examples capture during the game, and during previous games. Actual data may be used to compute variations or defects in the formations and related to the outcome of the play. Alternately, it may show the play formation look of the offense and defense and demonstrate the variations of play sets that follow. Plays with the same starting formation may be linked together for review. This may be useful for football where pass and running plays alike may have the same formation starting point. Defense coaches may detect subtle variations in the formations that may indicate the actual play being executed. Measurements regarding the formation of players may be considered measurement information.

A coach may want the ability to reposition or move icons around interactively in the process of analyzing a game. For example, a player may be shown a different path that may have resulted in creating space to "get open". The trail of the player moved may update in the diagram view 420, or the alternate path may be shown with the original. An artificial intelligence algorithm based on past performance may be used to adjust a position of adjacent players to the movement of a primary player. Trails may be automatically updated, and a defense of players may be automatically adjusted based on previous historical information. Criteria for how trails and player positions update with respect to movement of a particular player may be determined by user selectable parameters. In one embodiment, player repositioning may be recorded with the original data set so that an assistant coach may put together, in advance, a series of diagram examples for a player to review in a single sitting. In a specific embodiment, a coach may vary the pose of a player to show how it may affect mechanics of taking a shot or getting open to receive a shot.

Time-line view 426 may comprise a time-line controlled and/or annotated with events represented in a summary view, according to an embodiment. A time-line view may include a time-line representation. It may be linked to a play counter control 422 that steps through plays and subsequent video/animations sequential based on summary view 412. The play counter control 422 may be considered a time-line representation of a game, or a portion of a game. A play counter control may have basic VCR controls, such as play, pause, step and seek. In one embodiment, an entire game may be represented in a single time-line control. The time-line view may contain time-line controls. The time-line controls may include the play counter controls, and may contain the basic VCR controls, such as play, pause, step and seek. Data may be displayed against a global time-line control, such as representing the score as an increasing graph with appropriate time annotation. Clicking on points of interest within this data representation may cause the video and data to seek to the particular point in the game. This realizes yet another means of navigating through a particular game of interest.

In an embodiment, a user defined index may be used to relate performance over time, enabling a coach to easily identify segments of a game prone to a particular player's failure. Thresholds may be used to allow a coach to step through plays where certain index values are met. A time-line plot may be used to show an athletic performance measure such as an iron-man index. This may determine when a player may be getting tired at the end of a shift. It may be useful to display time-based trends against the time-line. For example, we may show the pace of play evaluation against the time left in the quarter. An index determined from one or more measurements may be considered measurement information that is used to identify one or more video sequences of one or more plays. Alternately, it may be used to identify a graphic generated from one or more plays.

Time-line view 426 may be temporally annotated with key events (pass, shots, rebound, etc.) during the play as spatially annotated in the diagram view 420, according to embodiments. Within a particular play, it may be useful to tag a supporting event such as a ball moving past mid-court, setting of a pick, taking a shot, dribbling, setting up a pass, a rebounding event, etc. User selected points of interest may be tagged in this view as well. It may be helpful to show on a time basis certain actions such as dribbling the ball, setting up the rebound, making a pass, etc. These are less likely specific time instances, as much as short windows of time. The personnel on court may be represented by a time-line view. Player selection based on whose on court may be reflected in the time-line view as high-lighted bars associated with segments of the game. The time-line view 426 may include a time-line representation of a game, or a portion of a game.

Portions of a time-line where multiple views of video are available may be annotated on a time-line itself, according to an embodiment. This may include replay footage that has been realigned to match the original play-time. This may be also true for sprite sequences in a zoomed video window display. The time-line view may be a natural mechanism for selecting a particular window of time for review, such as first quarter, second quarter, first half, etc. One particular window of interest may be the last two minutes in each quarter or half, when the level of play typically increases.

A diagram view may comprise a graphical representation snap shot of a path or motion of players over time, according to an embodiment. A playbook may be a diagram view. This may be synonymous with a chalkboard display of a play in football, or a play set in basketball. This may be represented as a top view, but may be displayed at an alternated viewing angle. It may be combined with animated icons (animated view 424) or merged with video (video view 402). Paths may be a static representation, or may update dynamically over time. A trail of passes (shown by dashed lines) and shots may be recorded. This may be merged with 3D animated view or actual video. A range of graphics may be employed such as a line (pass lanes and shots), a polygon (region defended by players), a shadow (light at goal), and circles (distribution of players). The position of passes may also be shown as a set location on the court, possibly accompanied by lines when the pass location is revealed. In one embodiment, all but the final pass leading up to the shot may be culled from the display. In another embodiment, the location of player maneuvers (such as pick and roll, passes, rebounds) may be similarly annotated on the display.

A display may show a segment of the window in tracking performance, such as the last six seconds of a play, according to an embodiment. This may be animated or fixed diagram potentially with arrows for annotation (virtual chalk board). The concept here is to quickly navigate through plays to get a summary of what happened. This may include a location of specific events such as the 5 to 6 seconds prior to a shot. The display may show only the trails of players involved in or defending against a particular play, or portion of the play. This may be synchronized with the players shown in the animated view. The spatial representation of player movement may be a useful for coach analysis, and direct annotation of the play by coaches may be an important feature. The user may be able to annotate the video, diagram and animated views manually. Potentially, a coach may add analysis to the data that would be recalled at the appropriate moment when playing back, and share with other members of the coaching staff or players. This idea may include a notes section. It may be possible to expand this view to a tracking telestrator, where an object may be selected and track automatically, and resulting position and trail may be shown.

A planned play sequence of actions leading up to an event may be termed a play set. Embodiments may allow for automatic annotation of play sets with name labels names, and these criteria may be used to navigate between clips. A play set may be associated with a user-friendly label that may be included in measurement information. Play sets for basketball may be distinguished by main type such as pick & roll (hand-off), pin-down, post-up and isolation. Plays may be further tagged by a shooter and participating players that setup the shot or create the open shot. It may be useful to distinguish sets by high/low, left/right, score/miss, shot/turn-over, shooter, etc, and separate the analysis of score sets/plays versus non scoring plays. Separation based on fouls and turnovers may be valid.

Play data and associated clips may be broken down by participating player, by scores vs. non-scores, broken down by play set types, and individual plays of each play set type. In a specific embodiment, the players assuming different spatial position for a given play set may be evaluated, such as a top of the key of a given play may be occupied by Smith 30% and Jones 45%. Player positioning in sets may be broken down by plays of a given set type (i.e. pick & roll) and by position on the court: left/right (35/65%), high/low (70/30%), etc. Users may tag sets/plays of interest, and the play set type may be added as a descriptor to the shot events displayed in the summary view. Measurement information may include play set types or sub-labels.

Standard events, such as shots, may be automatically sub-labeled by additional actions such as shot off dribble, shot off pass, shot off dump pass, shot off rebound, etc. This measurement information may be helpful to show a position of players at the start of set, and the subsequent direction the players move. A textbook version of a play relative to the current execution may be presented in a diagram view. Playbook representations may be displayed using traditional graphic displays in images such as Xs and Os. A playbook representation may be a diagram view. For advanced teams, it may be sufficient to show the standard execution of the play set versus historical executions of the play set. Comparisons may be made between different squads on the same time (show less experience player's proper technique) or between squads of different teams (show the way another team excels). Actual data may be used to compute variations or defects in the play and related to the outcome of the play. This may demonstrate the typical approach used, and rate the variations of a particular execution.

Combinations of players on opposing teams may be selected and a related sequence associated with the performance may be evaluated, according to embodiments. This may be accompanied by summary data that shows the benefits and deficiencies of particular player match-ups. This may control the events displayed in the summary view (and hence the video that may be allowed to be displayed). It may be also helpful to rate team to teams comparisons as well as comparing teams' offenses, team defenses, one team offense versus other teams defense. It may be useful to compare players in like positions (center of one team as compared to the center on the opposing team, the two centers playing on one team). This may be applicable for fantasy league following. A plus-minus rating may be shown for various combinations of players. Plus-minus values may also be normalized to actual indices reflective of performance (not lucky shots). Plus-minus values may also apply to opposing team match-ups.

In a basketball example, shots and/or steals constitute a boundary between plays. A missed shot and an offensive rebound could be within two different plays. A play set boundary may be marked by time segments 5-6 seconds long during half court play marked by pauses in the action. The last action or subset in each play leading up to the shot or turnover may be the most important. An important feature may be to display the location of each shot at the end of the set/play (ideal to tie this in with the official record) and the player who took the shot. Video may be tagged for clipping into plays, a last set of plays, and/or video around shots and turnovers.

Live statistics may be displayed in combination with video, animation, a diagram, a summary and time-line displays, according to an embodiment. These may include the current position (top-down view), current velocity (speedometer), live distance covered, time of possession, distanced covered, plus/minus score, iron-man, etc. Statistics may be aggregated based on play sequences, such as distance cover in a hockey shift, average height of basketball shot, top speed of a football run. These may be shown in the broadcast video, but not necessarily part of a presentation where video may be a sub-component. Alternate statistics may include individual/team live dash board (speed, coverage, etc), individual/line/team accumulation statistics, team averages, histogram-based stats, time-based stats, shot-based stats, zone-based stats, period/game summary, custom indices, event counters and event alerts. The statistics presented may reflect the player selections controlling the summary view. Athletic statistics may be grouped according to player rotations, which could be 8 minutes in length. Embodiments may be used to show whether performance drops off at the end of the rotation. Separate statistical analysis may be computed for the last two minutes of play in each quarter, half or period.

User directed criteria may represent whether players are correctly positioned relative to an opposing player and the ball, according to an embodiment. These criteria may also be used to determine how defensive players respond to various sets (i.e., pick and roll). These criteria may detect trends that helps explain poor standard statistics, such as poor plus/minus numbers, poor shot % numbers, etc. Helpful features include finding the spacing between the perimeter players or the four furthest offense players apart, detecting team clustering of the offensive formation (3 on 3, 2 on 2 or 1 on 1, 1-4 formation) and triangle offense, developing measure for defense traffic caused by offensive play, detecting player activity typically associated with movement of players around the ball, trying to find cases where offensive players are moving up against one another, or finding the start/stop position of position of players involved in a play set. A strong side indication may be used for versus weak side by splitting offensive players down the middle. Measurement information may be based on one or more of the measurements described above. In some cases, an animated view may include an animated diagram view.

Although the description of the web presentation in FIG. 4 may be tailored for basketball, the embodiments may apply to other sports. For example, American football may be another sport ripe for chalk board analysis as presented in the diagram and animation views. The trail location in the diagram view and track location of every player in the animation view may be provided as part of play analysis. It may be simpler to display only the trails of the key participants relative to a play such as a quarterback, running back, receiver, key blocker, tackle responsible for a sack, defender breaking up a pass, the safety, etc. The highlighted trails or routes may be annotated with specific events relative to the position such as quarterback (snap, hand-off point, pass point, tackle point), receiver (line-up, cut fake, catch and tackle point), running back (line-up, hand-off, cut fake, breaking the line, run out-of-bounds), or defender (line-up point, break block and tackle ball carrier). The motion of players outside the main play action may be summarized by arrows, such as showing the general direction of attack of defenders. As in the basketball embodiment, the diagram view may be annotated by the coaches, and alternate outcomes may be explored by repositioning players in the animation view. The summary view may illustrate the location of these key events on the football field, or a normalized scaled field representation relative to the line of scrimmage. Selection of key events in the summary view may allow the display of the corresponding play footage.

Video sequences corresponding to plays may be clipped to view actions or subsets of a play. For example, video sequences may be clipped to allow the viewing of the ball snap that begins a play, and a little after the event (tackle, penalty, out-of-bounds or score) that ends the play. This may be achieved using video processing algorithms that detect the motion of the quarterback and offensive line responding to the snap, and detection of the tackle or other event ending a particular play. The offensive formation and defensive formation at the start of a play may be used as a mechanism to summarize the current play (as with a thumbnail description), and as a means to recall similar plays. In one embodiment, starting formation may be compared automatically with a starting position of previous plays using a similarity measure based on player position and motion, and the video of like plays are shown in a sequential presentation. Alternately, a graphic may be generated showing the ball position resulting from plays with similar start formation as the current play.

Figure 7:
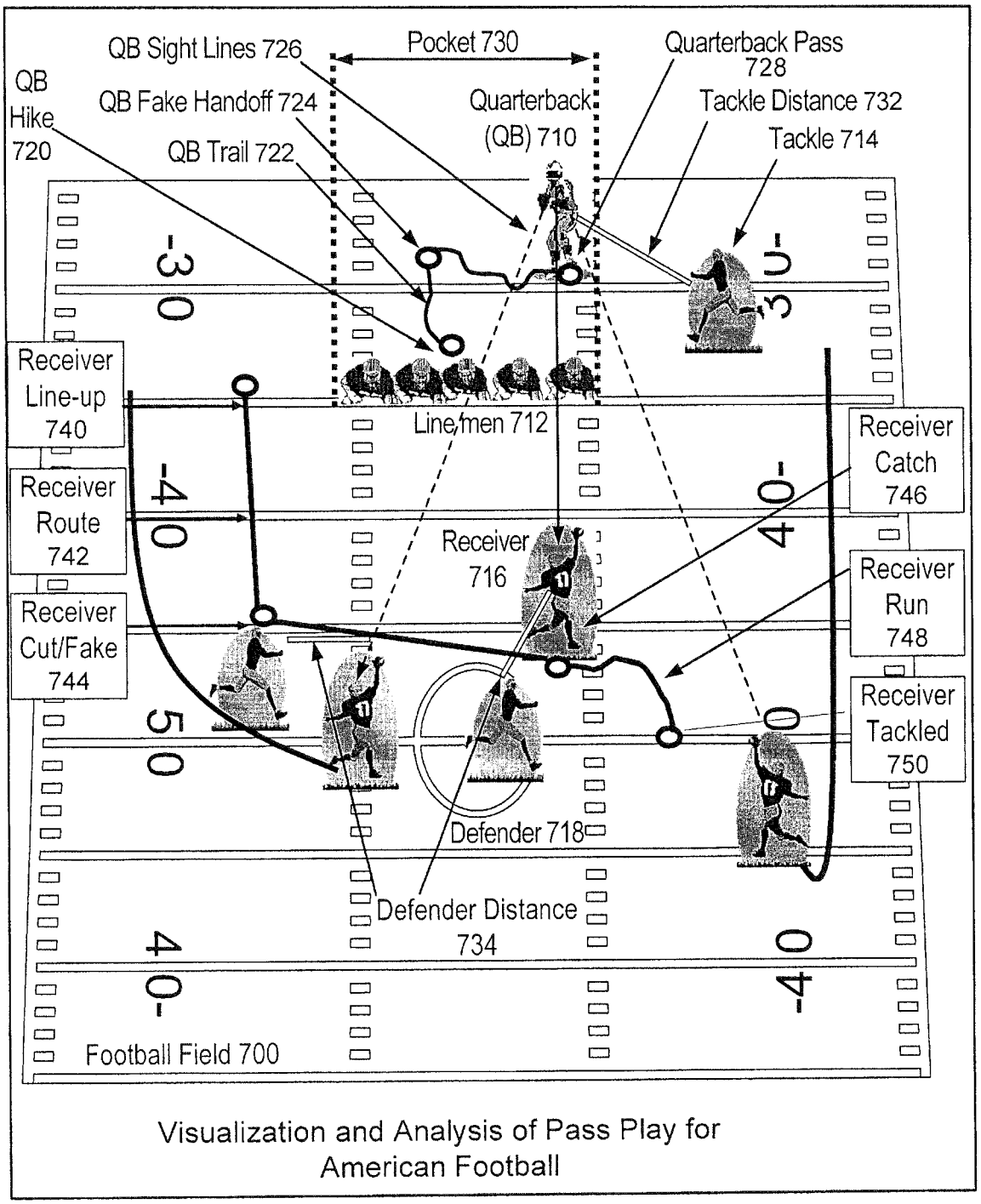
FIG. 7 is a diagram illustrating visualization and analysis of a pass play for American football, according to an embodiment.

Information about specific American football plays may be derived from analysis of the play sequence. For example, FIG. 7 illustrates a pass play occurring in the center portion of the football field 700. The roles of the key athletes in this simplified description include the quarterback 710 who handles the ball prior to the pass; the offensive linemen 712 who protect the quarterback prior to the pass in the pocket 730 (region behind the front five linemen); the defensive tackles 714 who rush and attempt to sack the quarterback by closing in the distance 732; the offensive receivers 716 who attempt to get in position to receive a pass from the quarterback; and the defenders 718, who guard receivers and keep a close enough distance 734 to intercept or knock down passes.

A play sequence for the quarterback may involve the quarterback receiving the snap 720 from the center lineman, the quarterback dropping back 722, the quarterback faking a hand-off to a running back 724, the quarterback scrambles around while scanning for possible receivers 726, and the quarterback plants his feet in position and makes a pass 728. Meanwhile, the play sequence for a receiver involves the receiver lining up on the line of scrimmage 740, the receiver running a route 742, the receiver making a cut or fake during the route 744, the receiver catching a pass 746 and the receiver running with the ball 748, until tackled by the defenders 750. The time and distance between various events in the play sequence may be measured, including the ball snap to quarterback pass, the ball pass to catch, a receiver line-up to route cut/fake, a receiver route cut/fake to ball reception, a receiver ball reception to receiver tackled, etc. Other measurements include player/ball trail length between events, player/ball speed between events, position/distance of teammates relative to a player trail, position/distance of opposing team relative to a player trail, spatial window around player affecting movements (quarterback, receiver, running back).

Play sequence analysis and measurements may facilitate player and team performance evaluation. Examples of play analysis include offensive line protection of a quarterback or kicker, a defensive blitz of the quarterback or kicker, a quarterback perception of open receivers, a defensive back coverage of potential receivers, a receiver's ability to make space and get open, blocker protection of the ball carrier, and the defenders' pursuit of the ball carrier. In another example, one aspect of interest to football may be the ability for the offensive line to protect the quarterback from the pass rush of the defense. The longer the quarterback has in the pocket (behind between the front five line men) tends to increase the likelihood of completing a pass to a receiver. Consequently, a time from the snap to the pass is a fair measure of the offensive line protecting the quarterback. A short distance between the quarterback and the nearest tackle at the time of the pass may be an indication of a rushed pass, particularly when the pass is incomplete. Long trails with frequent changes in direction may indicate the quarterbacks' ability to extend plays. The size of the protection pocket and the distance of the nearest defender signal the level of quarterback protection, as well as defense penetration. At any given time, the threat of the rushing defensive line may be measured as a function of the distance of the closest tackle to the quarterback, and space in the pocket for the quarterback to evade on-rushing tackles. Furthermore, the proximity of tackles and space in the pocket at the moment of the pass may indicate whether a pass was hurried or rushed.

The interactive web interface in FIG. 4 may be extended to other platforms. For example, a software application may provide the same look and feel of the web interface in FIG.

4, but the execution of the application and data serving may reside locally on the computer system. In a mobile embodiment, screen real estate of the mobile interface may be conserved by displaying only one of the windows in FIG. 4 at any given time. A tabbed scheme allows seamless navigation between the relevant views: summary, diagram, video, animation, game window, player selection, etc.

Figure 8:
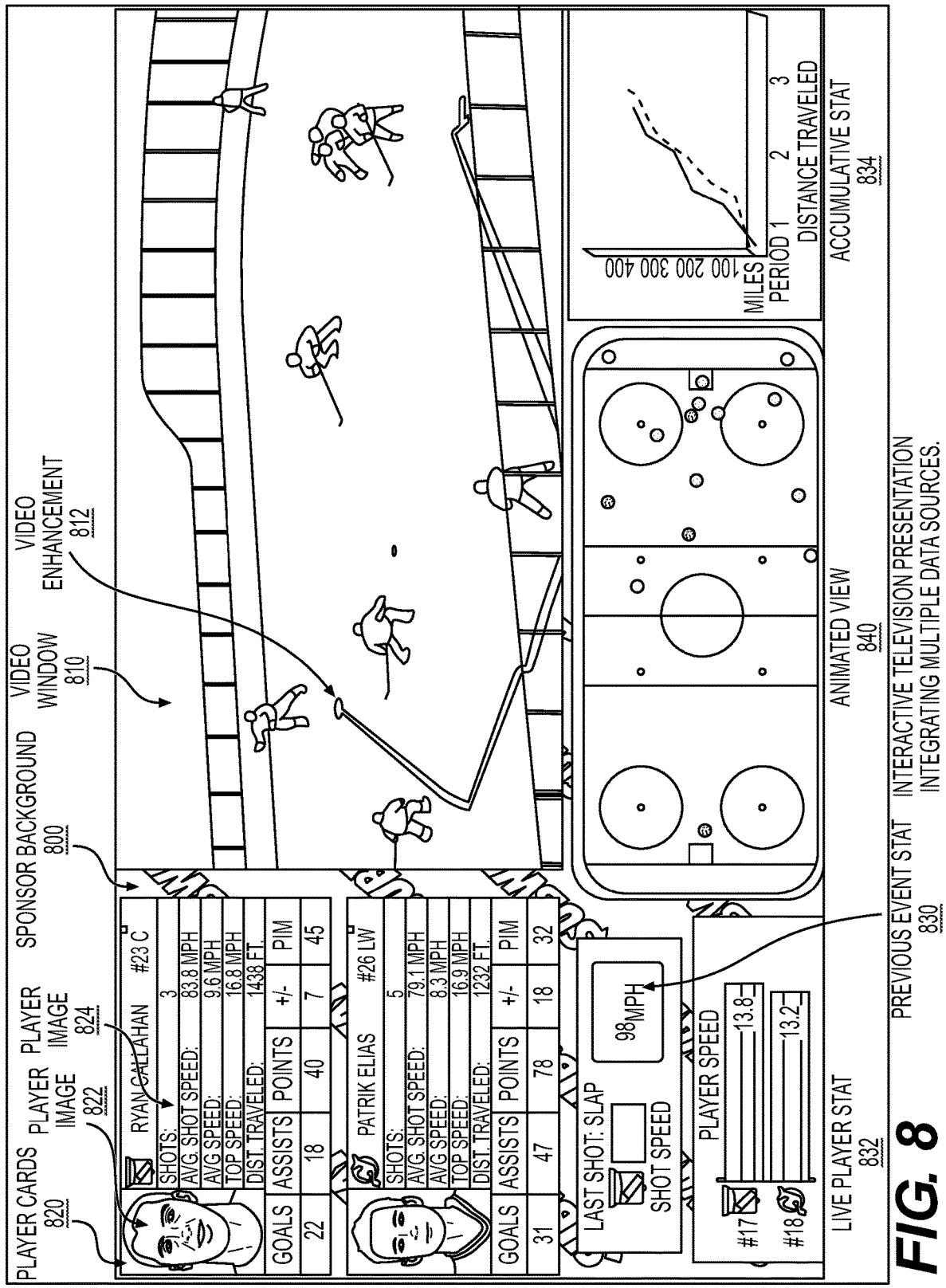
FIG. 8 is a diagram illustrating an interactive television presentation integrating multiple data sources, according to an embodiment.

FIG. 8 illustrates an interactive television embodiment that may be implemented on cable television platforms. The image frame of FIG. 8 represents a frame of the video, whereas the background of the view 800 may comprise a sponsor logo. The video window 810 may be fixed in the upper right hand corner and may contain graphical enhancements such as a puck highlighter 812. The image frame features a player on each team with player cards 820, comprised of a player head shots 822 and a combination of manual and automated player statistics 824 (shots, average shots speed, average speed, top speed, distanced traveled, goals, assists, Points, +/− and PIM). The statistics may relate directly to short play sequences such as shots or longer play sequences such as hockey shifts. In some embodiments, statistics are aggregated for fixed periods of the play sequences, such as distance covered in hockey shift or average speed of hockey shots. In a particular embodiment, players selected in the player cards may be highlighted in the video window with a ring around the players' feet. The image frame presents a combination of statistics including previous event statistics such as the player and speed of the last slap shot 830, live player statistics such as current velocity of the two featured players 832 and featured player accumulated stats such as total distance skated 834. The animated view of the ice 840 shows the current position of referees and players, color coded by team. In another embodiment, player trail diagramming may be incorporated in the video window or overlay the rink graphic as the diagram view window in FIG. 4. In a further embodiment, shots corresponding to a particular region of the goal are displayed over the rink graphic, possibly color coded by shot speed. Naturally, the implementation applies to multiple sports.

A video render platform for realizing embodiments such as that shown in FIG. 8 are described in patents such as Ser. No. 12/403,857, which is incorporated by reference in its entirety. A graphical insert may be rendered into the video image in a position corresponding to an object in the video image. The graphical insert may appear to track with the object, such as a ring tracking with the position of the player's feet during a sporting event. Part of the graphic may appear to track with an object in the video, such as an arrow pointing to a player where only the point of the arrow tracks the object location. The graphic may appear to track with the background scene of the video and represent the path or trail of an object moving across the background scene. The graphic may represent the three-dimensional (3D) trajectory of an object, and appear locked in 3D space as the camera moves. The graphic may appear to be overlaid on the two-dimensional (2D) surface of the display screen, and may appear to track with the movements of an object in the video. It may be a graphic containing text corresponding to the data representation and may be presented in a fixed location overlaying the video, may overlay the video and track with an object in the video, or may overlay the video and track with the background. Graphics may be inserted according to metadata that describe the view port of the camera, which may be derived directly from the video or generated using sensors in the vicinity of the camera.

Integrate server 120 may utilize a video render platform to combine data sources with a video source, according to an embodiment. Data manually or automatically derived on-site during sporting events may be electronically received at remote locations, and may be used by the video render platform to insert tracking graphics into the broadcast feed 108. This may be extended to the positioning of graphics, such as the first-down-line and line-of-scrimmage broadcast effects, by sending electronically "field positioning information." The data content may include both official manual sources 104 (down and distance, balls and strikes, etc.) and object tracking sources 112 (speed of pitch, speed of puck, player distance covered, etc). The data source may be related to short play sequence such as a pitch, medium play sequences such as a basketball play set, or longer play sequences such as a player shift in hockey or basketball. The data source may be received from the on-site (production or object tracking system), in studio (studio production or downstream player tracking), or from some another location (such as official stats head quarters). Alternate data sources may include field of view data acquired through sensors mounted on a camera tripod, on a camera lens or internal to the camera lens. The field of view corresponding to a video sequence or a portion of a video sequence may be determined by automatically analyzing the video sequence or the portion of the video sequence. Measurements may be extracted based on determining a field of view. Field of view may also be a measurement. Measurement information may be generated based on these measurements.

In an embodiment for American/Canadian football, the down and distance may be electronically received by a system in the studio, and a graphics may be inserted in the broadcast feed accompanying the first-down-line and the line-of-scrimmage. In one embodiment, the data may be automatically generated using character recognition of broadcast burn-ins containing the relevant information. In different embodiments, the composite graphics may track with the background, track with an object in the scene, or track with part of a fixed graphic overlaying the video (burn-in) with an associated graphic that tracks with an object in the scene, in part or whole. In different embodiments, integrated server 120 may create graphical insertions using metadata describing the view port of the camera, derived directly from the broadcast video 108 or transmitted from sensors at the venue 100. In a particular embodiment, integrated server 120 may generate the metadata from the broadcast video 108. In other embodiments, the rendering of graphics or integration of the graphics with the video is performed on the client side such as on television client 124, mobile client 126 or web client 128.

Figure 9:
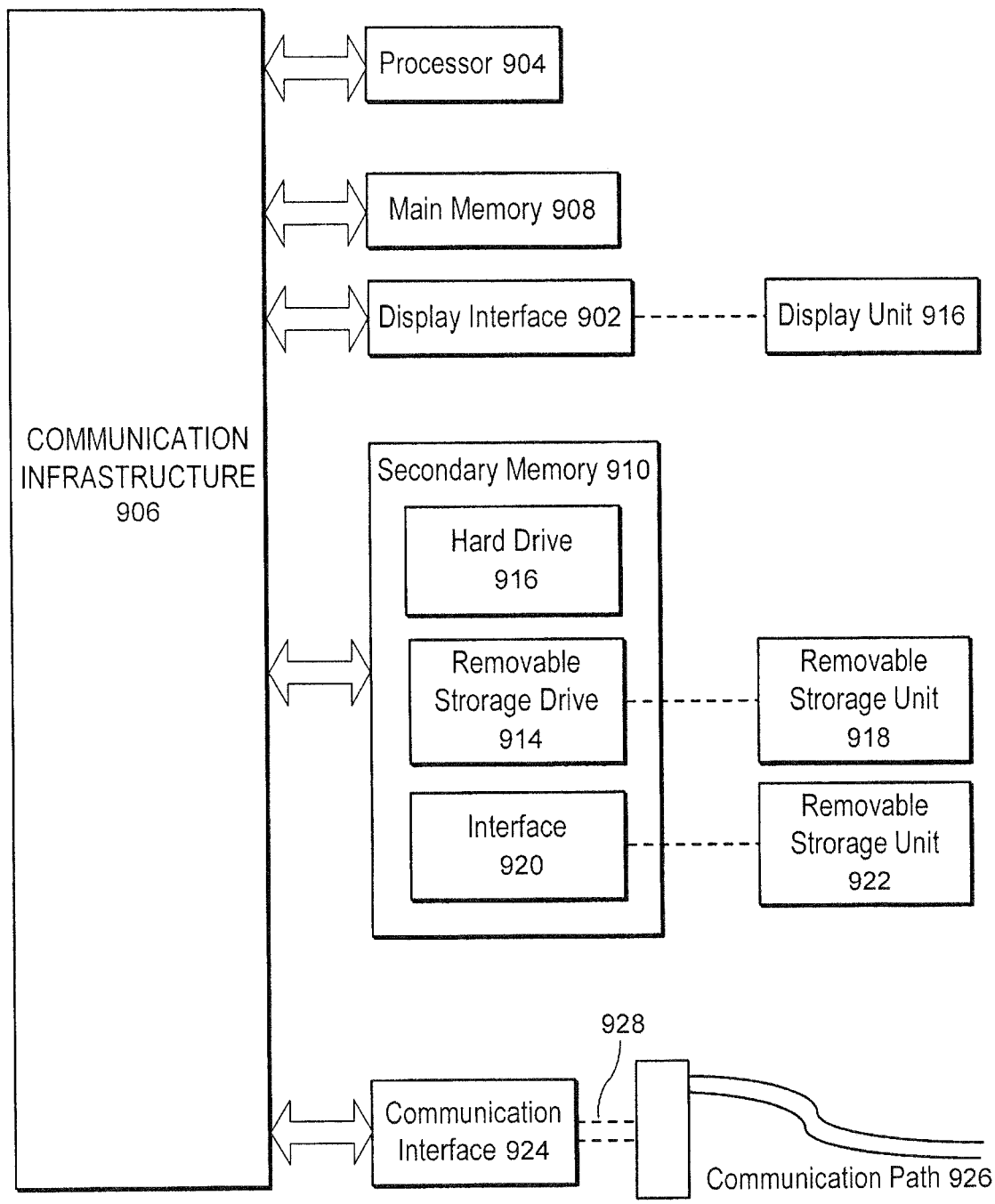
FIG. 9 is a diagram illustrating an example computing device which may be used in embodiment.

Aspects of the present invention, for the exemplary systems shown in FIGS. 1-8 or any part(s) or function(s) thereof may be implemented using hardware, software modules, firmware, tangible computer readable or computer usable storage media having instructions stored thereon, or a combination thereof and may be implemented in one or more computer systems or other processing systems. FIG. 9 illustrates an example computer system 900 in which the present invention, or portions thereof, can be implemented as computer-readable code. For example, manual data compilation 104, broadcast video production 108, automated data analysis 112, integrated server 120 and transmission 122 and/or any other components of the exemplary systems shown in FIGS. 1-8 can be implemented in hardware, firmware, or as computer-readable code on a computer system such as computer system 900. After reading this description, it will become apparent to a person skilled in the relevant art how to implement the invention using other computer systems and/or computer architectures.

Computer system 900 includes one or more processors, such as processor 904. Processor 904 can be a special purpose or a general purpose processor. Processor 904 is connected to a communication infrastructure 906 (for example, a bus or network).

Computer system 900 also includes a main memory 908, preferably random access memory (RAM), and may also include a secondary memory 910. Secondary memory 910 may include, for example, a hard disk drive 912 and/or a removable storage drive 914. Removable storage drive 914 may comprise a floppy disk drive, a magnetic tape drive, an optical disk drive, a flash memory, or the like. The removable storage drive 914 reads from and/or writes to a removable storage unit 918 in a well known manner. Removable storage unit 918 may comprise a floppy disk, magnetic tape, optical disk, etc. which is read by and written to by removable storage drive 914. As will be appreciated by persons skilled in the relevant art(s), removable storage unit 918 includes a computer usable storage medium having stored therein computer software and/or data.

In alternative implementations, secondary memory 910 may include other similar means for allowing computer programs or other instructions to be loaded into computer system 900. Such means may include, for example, a removable storage unit 922 and an interface 920. Examples of such means may include a program cartridge and cartridge interface (such as that found in video game devices), a removable memory chip (such as an EPROM, or PROM) and associated socket, and other removable storage units 922 and interfaces 920 which allow software and data to be transferred from the removable storage unit 922 to computer system 900.

Computer system 900 may also include a communications interface 924. Communications interface 924 allows software and data to be transferred between computer system 900 and external devices. Communications interface 924 may include a modem, a network interface (such as an Ethernet card), a communications port, a PCMCIA slot and card, a wireless card, or the like. Software and data transferred via communications interface 924 are in the form of signals which may be electronic, electromagnetic, optical, or other signals capable of being received by communications interface 924. These signals are provided to communications interface 924 via a communications path 929. Communications path 929 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 918, removable storage unit 922, a hard disk installed in hard disk drive 912, and signals carried over communications path 929. Computer program medium and computer usable medium can also refer to memories, such as main memory 908 and secondary memory 910, which can be memory semiconductors (e.g. DRAMs, etc.). These computer program products are means for providing software to computer system 900.

Computer programs (also called computer control logic) are stored in main memory 908 and/or secondary memory 910. Computer programs may also be received via communications interface 924. Such computer programs, when executed, enable computer system 900 to implement the present invention as discussed herein. In particular, the computer programs, when executed, enable processor 904 to implement the processes of the present invention, such as the steps in the methods described above. Accordingly, such computer programs represent controllers of the computer system 900. Where the invention is implemented using software, the software may be stored in a computer program product and loaded into computer system 900 using removable storage drive 914, interface 920, hard drive 912 or communications interface 924.

Embodiments of the invention also may be directed to computer products comprising software stored on any computer useable medium. Such software, when executed in one or more data processing device, causes a data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer implemented method, comprising:
   receiving a video stream of a sporting event;
   extracting a first play sequence comprising one or more athletic actions wherein the first play sequence is represented as a first icon;
   extracting a second play sequence comprising one or more athletic actions wherein the second play sequence is represented as a second icon, wherein the first play sequence and the second play sequence are different temporal play sequences;
   determining whether the first play sequence and the second play sequence satisfy a similarity measure based on at least a comparison of the one or more athletic actions of the first play sequence and the one or more athletic actions of the second play sequence;
   linking the first play sequence and the second play sequence when the similarity measure is satisfied;

transmitting coded play sequences as an interactive media interface including multiple interactive options, wherein the multiple interactive options comprise moving a player in the first play sequence or the second play sequence from an actual position during the first play sequence or the second play sequence; and updating the first play sequence or the second play sequence based on the moving of the player in the first play sequence or the second play sequence.

2. The method of claim 1, wherein the similarity measure establishes a relationship between the first play sequence and the second play sequence.

3. The method of claim 2, wherein the relationship between the first play sequence and the second play sequence is based on a similar athletic action occurring in the first play sequence and the second play sequence.

4. The method of claim 1, wherein the first play sequence and the second play sequence are detected using a video tracking technique.

5. The method of claim 4, wherein the video tracking technique includes an object tracking technology utilizing fixed cameras or sensors.

6. The method of claim 1, wherein the first play sequence and the second play sequence include a timeframe surrounding the one or more athletic actions.

7. The method of claim 1, wherein the video stream is a live broadcast video wherein a basic play sequence of the one or more athletic actions of the first play sequence and the one or more athletic actions of the second play sequence is derived from the live broadcast video.

8. The method of claim 1, further comprising:
displaying the one or more athletic actions of the first play sequence and the second play sequence related to scoring opportunities.

9. A non-transitory computer readable storage medium comprising lines of code executable by a processor and configured to perform operations comprising:
receiving a video stream of a sporting event;
extracting a first play sequence comprising one or more athletic actions wherein the first play sequence is represented by a first icon;
extracting a second play sequence comprising one or more athletic actions wherein the second play sequence is represented as a second icon, wherein the first play sequence and the second play sequence are different temporal play sequences;
determining whether the first play sequence and the second play sequence satisfy a similarity measure based on at least a comparison of the one or more athletic actions of the first play sequence and the one or more athletic actions of the second play sequence;
linking the first play sequence and the second play sequence when the similarity measure is satisfied;
transmitting coded play sequences as an interactive media interface including multiple interactive options, wherein the multiple interactive options comprise moving a player in the first play sequence or the second play sequence from an actual position during the first play sequence or the second play sequence; and
updating the first play sequence or the second play sequence based on the moving of the player in the first play sequence or the second play sequence.

10. The non-transitory computer reasonable storage medium of claim 9, wherein the similarity measure establishes a relationship between the first play sequence and the second play sequence.

11. The non-transitory computer reasonable storage medium of claim 10, wherein the relationship between the first play sequence and the second play sequence is based on a similar athletic action occurring in the first play sequence and the second play sequence.

12. The non-transitory computer readable storage medium of claim 9, wherein the first play sequence and the second play sequence are detected using a video tracking technique.

13. The non-transitory computer readable storage medium of claim 12, wherein the video tracking technique includes an object tracking technology utilizing fixed cameras or sensors.

14. The non-transitory computer reasonable storage medium of claim 9, wherein the first play sequence and the second play sequence include a timeframe surrounding the one or more athletic actions.

15. The non-transitory computer readable storage medium of claim 9, wherein the video stream is a live broadcast video wherein a basic play sequence of the one or more athletic actions of the first play sequence and the one or more athletic actions of the second play sequence is derived from the live broadcast video.

16. The non-transitory computer readable storage medium of claim 9, wherein the operations further comprise:
displaying the one or more athletic actions of the first play sequence and the second play sequence related to scoring opportunities.

17. A processor connected to a communication infrastructure, and configured to:
receive a video stream of a sporting event;
extract a first play sequence comprising one or more athletic actions wherein the first play sequence is represented as a first icon;
extract a second play sequence comprising one or more athletic actions wherein the second play sequence is represented as a second icon, wherein the first play sequence and the second play sequence are different temporal play sequences;
determine whether the first play sequence and the second play sequence satisfy a similarity measure based on at least a comparison of the one or more athletic actions of the first play sequence and the one or more athletic actions of the second play sequence;
link the first play sequence and the second play sequence when the similarity measure is satisfied;
generate, for transmission, coded play sequences as an interactive media interface including multiple interactive options, wherein the multiple interactive options comprise moving a player in the first play sequence or the second play sequence from an actual position during the first play sequence or the second play sequence; and
update the first play sequence or the second play sequence based on the moving of the player in the first play sequence or the second play sequence.

18. The processor of claim 17, wherein the similarity measure establishes a relationship between the first play sequence and the second play sequence and wherein the relationship between the first play sequence and the second play sequence is based on a similar athletic action occurring in the first play sequence and the second play sequence.

19. The method of claim 1, wherein the multiple interactive options comprise multiple views of summary, diagram, video, animation, game window, or player selection.

* * * * *